United States Patent
Honjo

(10) Patent No.: US 12,083,897 B2
(45) Date of Patent: Sep. 10, 2024

(54) VEHICLE TEMPERATURE ADJUSTMENT SYSTEM

(71) Applicant: HONDA MOTOR CO., LTD., Tokyo (JP)

(72) Inventor: Takuya Honjo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 354 days.

(21) Appl. No.: 17/573,198

(22) Filed: Jan. 11, 2022

(65) Prior Publication Data
US 2022/0219541 A1 Jul. 14, 2022

(30) Foreign Application Priority Data

Jan. 13, 2021 (JP) .................. 2021-003821

(51) Int. Cl.
*B60L 3/00* (2019.01)
(52) U.S. Cl.
CPC ..................... *B60L 3/00* (2013.01)
(58) Field of Classification Search
CPC ........ F01P 7/16; F01P 7/165; F01P 2005/105; B60L 2240/36; B60L 3/00; B60R 16/0232
USPC ................................. 165/288, 293
See application file for complete search history.

(56) References Cited

U.S. PATENT DOCUMENTS

| | | | |
|---|---|---|---|
| 6,201,365 B1 | 3/2001 | Hara et al. | |
| 6,323,613 B1 * | 11/2001 | Hara | H02K 16/00 903/952 |
| 2013/0213324 A1 * | 8/2013 | Saitoh | F01P 7/16 123/41.09 |
| 2014/0291411 A1 * | 10/2014 | Tamaki | F24D 3/18 62/238.7 |
| 2015/0047379 A1 * | 2/2015 | Honda | F25B 25/005 62/177 |
| 2015/0075196 A1 * | 3/2015 | Yanachi | F25B 49/02 62/160 |
| 2017/0023263 A1 * | 1/2017 | Tamaki | F24D 19/1069 |
| 2018/0178629 A1 * | 6/2018 | Suzuki | B60H 1/00885 |
| 2019/0003742 A1 * | 1/2019 | Ikari | G05D 23/19 |

FOREIGN PATENT DOCUMENTS

JP 2001-238406 A 8/2001

* cited by examiner

*Primary Examiner* — Tho V Duong
(74) *Attorney, Agent, or Firm* — Paratus Law Group, PLLC

(57) ABSTRACT

A vehicle temperature adjustment system includes a first temperature adjustment circuit, a second temperature adjustment circuit, a heat exchanger configured to perform heat exchange between the first temperature adjustment medium and the second temperature adjustment medium, a first temperature sensor configured to detect a temperature of the first temperature adjustment medium flowing into the heat exchanger, a second temperature sensor configured to detect a temperature of the first temperature adjustment medium flowing out of the heat exchanger, a third temperature sensor configured to detect a temperature of the second temperature adjustment medium flowing into the heat exchanger, and a detection unit configured to detect an abnormality in the heat exchanger based on each detection value of the first temperature sensor, the second temperature sensor, and the third temperature sensor.

5 Claims, 3 Drawing Sheets

VEHICLE TEMPERATURE ADJUSTMENT SYSTEM

CROSS-REFERENCE TO RELATED APPLICATIONS

This application is based on and claims priority under 35 USC 119 from Japanese Patent Application No. 2021-003821 filed on Jan. 13, 2021.

TECHNICAL FIELD

The present disclosure relates to a vehicle temperature adjustment system mounted on an electric vehicle or the like.

BACKGROUND ART

In related art, there has been known a vehicle including a rotary electric machine and an electric power conversion device, such as an electric vehicle. In general, since the rotary electric machine and the electric power conversion device generate heat during operation, a vehicle temperature adjustment system which adjusts a temperature of the rotary electric machine and the power conversion device is mounted on a vehicle including the rotary electric machine and the power conversion device.

For example, JP-A-2001-238406 discloses a vehicle temperature adjustment system including a circulation path L through which oil circulates and which cools an electric motor M, a circulation path F through which cooling water circulates and which cools an inverter U, and a heat exchange unit (oil cooler C) which performs heat exchange between the cooling water flowing through the circulation path F and the oil flowing through the circulation path L. A radiator R is provided in the circulation path F, and the cooling water flowing through the circulation path F is cooled by the radiator R. The oil flowing through the circulation path L is cooled by the heat exchange between the cooling water flowing through the circulation path F and the oil flowing through the circulation path L in the heat exchange unit (oil cooler C). Therefore, in the vehicle temperature adjustment system in JP-A-2001-238406, a radiator for cooling the oil is not necessary, and the cooling water flowing through the circulation path F and the oil flowing through the circulation path L can be cooled by one radiator, thereby miniaturizing the vehicle temperature adjustment system.

In a configuration in which a temperature adjustment medium for performing temperature adjustment of a rotary electric machine such as an electric motor is cooled by heat exchange with a temperature adjustment medium for performing temperature adjustment of an electric power conversion device, when an abnormality such as a failure in a heat exchanger occurs, the temperature of the rotary electric machine is increased, which may lead to a failure of the rotary electric machine. However, in the configuration in JP-A-2001-238406, it is not possible to detect an abnormality in the heat exchange unit.

SUMMARY

The present disclosure provides a vehicle temperature adjustment system capable of detecting an abnormality in a heat exchanger which performs heat exchange between different temperature adjustment media.

According to an aspect of the present disclosure, there is provided a vehicle temperature adjustment system, including:
a first temperature adjustment circuit which includes a first pump and through which a first temperature adjustment medium circulates;
a second temperature adjustment circuit which includes a second pump and through which a second temperature adjustment medium circulates;
a heat exchanger configured to perform heat exchange between the first temperature adjustment medium and the second temperature adjustment medium;
a first temperature sensor configured to detect a temperature of the first temperature adjustment medium flowing into the heat exchanger;
a second temperature sensor configured to detect a temperature of the first temperature adjustment medium flowing out of the heat exchanger;
a third temperature sensor configured to detect a temperature of the second temperature adjustment medium flowing into the heat exchanger; and
a detection unit configured to detect an abnormality in the heat exchanger based on each detection value of the first temperature sensor, the second temperature sensor, and the third temperature sensor.

According to the present disclosure, it is possible to detect an abnormality in a heat exchanger which performs heat exchange between different temperature adjustment media.

DESCRIPTION OF EMBODIMENTS

Figure 1:
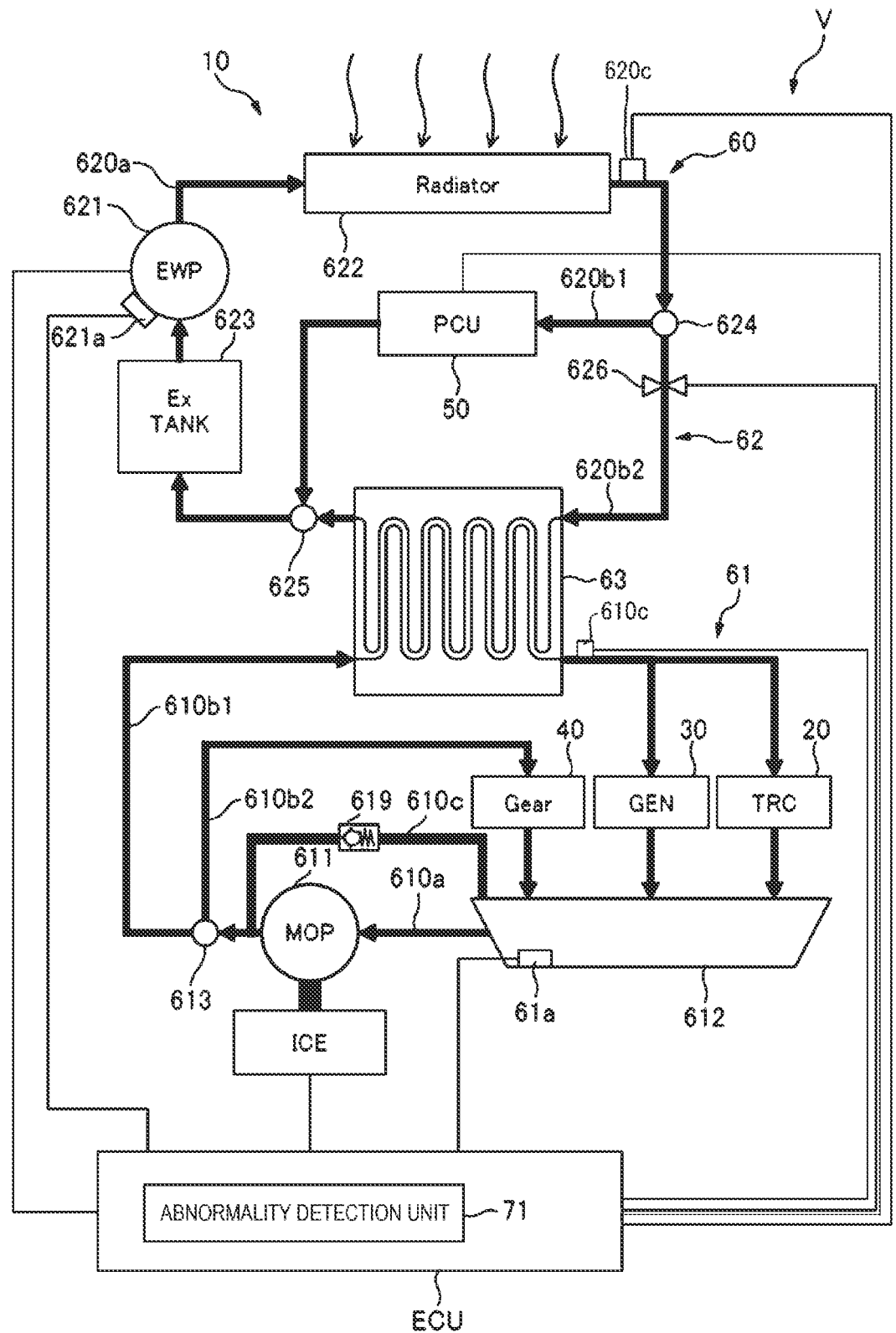
FIG. 1 is a block diagram illustrating a vehicle temperature adjustment system according to an embodiment of the present disclosure.

Hereinafter, an embodiment of a vehicle on which a vehicle temperature adjustment system according to the present disclosure is mounted will be described with reference to the accompanying drawings. It should be noted that the drawings are viewed in a direction of reference numerals. In the present specification and the like, in order to simplify and clarify the description, a front-rear direction, a left-right direction, and an upper-lower direction are respectively described in accordance with directions viewed from a driver of a vehicle. In the drawings, a front side of the vehicle is denoted by Fr, a rear side thereof is denoted by Rr, a left side thereof is denoted by L, a right side thereof is denoted by R, an upper side thereof is denoted by U. and a lower side thereof is denoted by D.

Embodiment

First, a vehicle temperature adjustment system 10 according to an embodiment of the present disclosure will be described with reference to FIG. 1.

As illustrated in FIG. 1, the vehicle temperature adjustment system 10 according to the present embodiment is mounted on a vehicle V, and includes an internal combustion engine ICE, a control device ECU, an electric motor 20, a power generator 30, a transmission device 40, an electric power conversion device 50, and a temperature adjustment circuit 60.

The electric motor 20 is a rotary electric machine which outputs power for driving the vehicle V using electric power stored in an electric storage device (not illustrated) mounted on the vehicle V or electric power generated by the power generator 30. When the vehicle V is braked, the electric motor 20 may generate electric power by kinetic energy of drive wheels of the vehicle V to charge the electric storage device described above.

The power generator 30 is a rotary electric machine which generates electric power by the power of the internal combustion engine ICE, charges the electric storage device described above, or supplies electric power to the electric motor 20.

The transmission device 40 is a device, such as a gear-type power transmission device, reducing a speed of the power output from the electric motor 20 and transmitting the speed-reduced power to the drive wheels.

The electric power conversion device 50 includes a power drive unit (PDU) (not illustrated) which converts the electric power output from the electric storage device from a direct current to an alternating current to control input and output power of the electric motor 20 and the power generator 30, and a voltage control unit (VCU) (not illustrated) which boosts the electric power output from the electric storage device as necessary. The VCU may step down the electric power generated by the electric motor 20 when the electric motor 20 generates the electric power in a case where the vehicle V is braked.

The temperature adjustment circuit 60 includes: a first temperature adjustment circuit 61 through which a non-conductive first temperature adjustment medium TCM1 circulates and which adjusts temperature of the electric motor 20, the power generator 30, and the transmission device 40; a second temperature adjustment circuit 62 through which a conductive second temperature adjustment medium TCM2 circulates and which adjusts a temperature of the electric power conversion device 50; and a heat exchanger 63 which performs heat exchange between the first temperature adjustment medium TCM1 and the second temperature adjustment medium TCM2. The non-conductive first temperature adjustment medium TCM1 is, for example, oil which is called automatic transmission fluid (ATF), can lubricate the electric motor 20, the power generator 30, and the transmission device 40, and can adjust the temperature thereof. The conductive second temperature adjustment medium TCM2 is, for example, cooling water which is called long life coolant (LLC).

The first temperature adjustment circuit 61 is provided with a first pump 611 and a storage unit 612. The first pump 611 is a mechanical pump driven by the power of the internal combustion engine ICE and the rotational force of an axle (not illustrated) of the vehicle V. The storage unit 612 stores the first temperature adjustment medium TCM1 circulating through the first temperature adjustment circuit 61. The storage unit 612 is, for example, an oil pan provided at a bottom of a housing (not illustrated) in which the electric motor 20, the power generator 30, and the transmission device 40 are housed. The first temperature adjustment circuit 61 includes a branching portion 613. The first temperature adjustment circuit 61 includes: a pressure feed flow path 610*a* in which the first pump 611 is provided, of which an upstream end portion is connected to the storage unit 612, and of which a downstream end portion is connected to the branching portion 613 through the first pump 611; a first branch flow path 610*b*1 in which the electric motor 20 and the power generator 30 are provided, of which an upstream end portion is connected to the branching portion 613, and of which a downstream end portion is connected to the storage unit 612 through the electric motor 20 and the power generator 30; and a second branch flow path 610*b*2 in which the transmission device 40 is provided, of which an upstream end portion is connected to the branching portion 613, and of which a downstream end portion is connected to the storage unit 612 through the transmission device 40. In the first temperature adjustment circuit 61, the heat exchanger 63 is disposed upstream of the electric motor 20 and the power generator 30 in the first branch flow path 610*b*1.

Therefore, in the first temperature adjustment circuit 61, a flow path in which the first temperature adjustment medium TCM1 pressure-fed from the first pump 611 is cooled by the heat exchange with the second temperature adjustment medium TCM2 in the heat exchanger 63 through the first branch flow path 610*b*1 from the branching portion 613, is supplied to the electric motor 20 and the power generator 30 to lubricate the electric motor 20 and the power generator 30 and adjust the temperature thereof, and then is stored in the storage unit 612, and a flow path in which the first temperature adjustment medium TCM1 pressure-fed from the first pump 611 is supplied to the transmission device 40 through the second branch flow path 610*b*2 from the branching portion 613 to lubricate the transmission device 40 and adjust the temperature thereof, and then is stored in the storage unit 612 are formed in parallel. The first temperature adjustment medium TCM1 stored in the storage unit 612 flows through the pressure feed flow path 610*a* and is supplied to the first pump 611, and the first temperature adjustment medium TCM1 circulates through the first temperature adjustment circuit 61.

In the present embodiment, the first branch flow path 610*b*1 and the second branch flow path 610*b*2 are formed such that a flow rate of the first temperature adjustment medium TCM1 flowing through the first branch flow path 610*b*1 is larger than a flow rate of the first temperature adjustment medium TCM1 flowing through the second branch flow path 610*b*2.

The first temperature adjustment circuit 61 is provided with a first temperature sensor 61*a* which detects a temperature of the first temperature adjustment medium TCM1 circulating through the first temperature adjustment circuit 61. In the present embodiment, the first temperature sensor 61*a* is provided in the storage unit 612, which is an oil pan, and detects the temperature of the first temperature adjustment medium TCM1 stored in the storage unit 612. The first temperature sensor 61*a* outputs a detection value of the temperature of the first temperature adjustment medium TCM1 stored in the storage unit 612 to the control device ECU. The first temperature sensor 61*a* is an example of a first temperature sensor which detects the temperature Toil_in of the first temperature adjustment medium TCM1 flowing into the heat exchanger 63.

The first temperature adjustment circuit 61 further includes a pressure adjustment circuit 610*c* of which an upstream end portion is connected to the storage unit 612, and of which a downstream end portion is connected to the pressure feeding flow path 610*a* on a downstream side of the first pump 611. The pressure adjustment circuit 610*c* is provided with a pressure adjustment valve 619. The pressure adjustment valve 619 may be a check valve or an electromagnetic valve such as a solenoid valve. When the liquid pressure of the first temperature adjustment medium TCM1 pressure-fed from the first pump 611 is equal to or higher than a predetermined upper limit pressure, the pressure adjustment valve 619 is opened, and a part of the first temperature adjustment medium TCM1 pressure-fed from the first pump 611 is returned to the storage unit 612. Accordingly, the liquid pressure of the first temperature adjustment medium TCM1 flowing through the first branch flow path 610b1 and the second branch flow path 610b2 is held to be equal to or lower than the upper limit pressure.

A second temperature sensor 610c is provided between the heat exchanger 63 and the electric motor 20 and between the heat exchanger 63 and the power generator 30 in the flow path of the first temperature adjustment medium TCM1 in the first temperature adjustment circuit 61. The second temperature sensor 610c is an example of a second temperature sensor which detects the temperature Toil_out of the first temperature adjustment medium TCM1 flowing out of the heat exchanger 63. The second temperature sensor 610c outputs a detection value of the temperature of the first temperature adjustment medium TCM1 flowing out of the heat exchanger 63 to the control device ECU.

The second temperature adjustment circuit 62 is provided with a second pump 621, a radiator 622, and a storage tank 623. The second pump 621 is, for example, an electric pump which is driven by the electric power stored in the electric storage device. The radiator 622 is disposed at a front portion of the vehicle V. and is a heat dissipation device which cools the second temperature adjustment medium TCM2 by traveling wind when the vehicle V is traveling. The storage tank 623 is a tank in which the second temperature adjustment medium TCM2 circulating through the second temperature adjustment circuit 62 is temporarily stored. Even when cavitation occurs in the second temperature adjustment medium TCM2 circulating through the second temperature adjustment circuit 62, the cavitation occurred in the second temperature adjustment medium TCM2 disappears because the second temperature adjustment medium TCM2 circulating through the second temperature adjustment circuit 62 is temporarily stored in the storage tank 623.

The second temperature adjustment circuit 62 includes a branching portion 624 and a merging portion 625. The second temperature adjustment circuit 62 includes a pressure feed flow path 620a in which the storage tank 623, the second pump 621, and the radiator 622 are provided in this order from an upstream side, of which an upstream end portion is connected to the merging portion 625, and of which an downstream end portion is connected to the branching portion 624 through the storage tank 623, the second pump 621, and the radiator 622. The second temperature adjustment medium TCM2 stored in the storage tank 623 is pressure-fed by the second pump 621 through the pressure feed flow path 620a, and is cooled by the radiator 622.

The second temperature adjustment circuit 62 further includes: a first branch flow path 620b1 in which the electric power conversion device 50 is provided, of which an upstream end portion is connected to the branching portion 624, and of which a downstream end portion is connected to the merging portion 625 through the electric power conversion device 50; and a second branch flow path 620b2 in which the heat exchanger 63 is provided, of which an upstream end portion is connected to the branching portion 624, and of which a downstream end portion is connected to the merging portion 625 through the heat exchanger 63. In the present embodiment, a valve device 626 is provided as a flow rate adjustment valve in a portion of the second branch flow path 620b2 upstream of the heat exchanger 63. In the present embodiment, the valve device 626 may be an ON-OFF valve which switches the second branch flow path 620b2 between a fully open state and a fully closed state, or may be a variable flow rate valve which can adjust a flow rate of the second temperature adjustment medium TCM2 flowing through the second branch flow path 620b2. The valve device 626 is controlled by the control device ECU.

Therefore, the second temperature adjustment medium TCM2 pressure-fed by the second pump 621 and cooled by the radiator 622 in the pressure-feed flow path 620a branches into the first branch flow path 620b1 and the second branch flow path 620b2 at the branching portion 624. The second temperature adjustment medium TCM2 flowing through the first branch flow path 620b1 cools the electric power conversion device 50 and merges with the second branch flow path 620b2 and the pressure feeding flow path 620a at the merging portion 625. The second temperature adjustment medium TCM2 flowing through the second branch flow path 620b2 cools the first temperature adjustment medium TCM1 by exchanging heat with the first temperature adjustment medium TCM1 in the heat exchanger 63, and merges with the first branch flow path 620b1 and the pressure feed flow path 620a at the merging portion 625. The second temperature adjustment medium TCM2 flowing through the first branch flow path 620b1 and the second temperature adjustment medium TCM2 flowing through the second branch flow path 620b2 are merged at the merging portion 625, flow through the pressure feed flow path 620a, and are temporarily stored in the storage tank 623. Then, the second temperature adjustment medium TCM2 stored in the storage tank 623 is supplied again to the second pump 621 through the pressure feed flow path 620a, and the second temperature adjustment medium TCM2 circulates through the second temperature adjustment circuit 62.

In the present embodiment, the first branch flow path 620b1 and the second branch flow path 620b2 are formed such that the flow rate of the second temperature adjustment medium TCM2 flowing through the first branch flow path 620b1 is larger than the flow rate of the second temperature adjustment medium TCM2 flowing through the second branch flow path 620b2.

A third temperature sensor 620c is provided between the radiator 622 and the branching portion 624 in the flow path of the second temperature adjustment medium TCM2 in the second temperature adjustment circuit 62. The third temperature sensor 620c outputs a detection value of the temperature of the second temperature adjustment medium TCM2 flowing from the radiator 622 into the branching portion 624 to the control device ECU. The third temperature sensor 620c is an example of a third temperature sensor which detects the temperature Tw of the second temperature adjustment medium TCM2 flowing into the heat exchanger 63.

In the first temperature adjustment circuit 61, the temperature of the first temperature adjustment medium TCM1 stored in the storage unit 612 after cooling the electric motor 20, the power generator 30, and the transmission device 40 is about 100 [° C.]. Therefore, the first temperature adjustment medium TCM1 of about 100 [° C.] is supplied to the heat exchanger 63.

Meanwhile, in the second temperature adjustment circuit 62, a temperature of the second temperature adjustment medium TCM2 cooled by the radiator 622 is about 40 [° C.]. Since the second temperature adjustment medium TCM2 supplied to the heat exchanger 63 does not pass through the electric power conversion device 50 which is a device to be temperature-controlled, the second temperature adjustment medium TCM2 of about 40 [° C.] is supplied to the heat exchanger 63.

The heat exchanger 63 performs heat exchange between the first temperature adjustment medium TCM1 of about 100 [° C.] and the second temperature adjustment medium TCM2 of about 40 [° C.] which are supplied to the heat exchanger 63. Then, the first temperature adjustment medium TCM1 of about 80 [° C.] is discharged from the heat exchanger 63 to a downstream side of the first branch flow path 610b1 of the first temperature adjustment circuit 61, and the second temperature adjustment medium TCM2 of about 70 [° C.] is discharged from the heat exchanger 63 to a downstream side of the second branch flow path 620b2 of the second temperature adjustment circuit 62.

In this way, since the first temperature adjustment medium TCM1 is cooled in the heat exchanger 63, the temperature adjustment circuit 60 can cool the first temperature adjustment medium TCM1 without providing a radiator for cooling the first temperature adjustment medium TCM1. Therefore, since the temperature adjustment circuit 60 can cool the first temperature adjustment medium TCM1 flowing through the first temperature adjustment circuit 61 and the second temperature adjustment medium TCM2 flowing through the second temperature adjustment circuit 62 by one radiator 622, the temperature adjustment circuit 60 can be miniaturized.

The control device ECU controls the internal combustion engine ICE, the electric power conversion device 50, the second pump 621, and the valve device 626. A rotational speed sensor 621a which detects a rotational speed of the second pump 621 is attached to the second pump 621. The rotational speed sensor 621a outputs a detection value of the rotational speed of the second pump 621 to the control device ECU.

In addition, the control device ECU includes an abnormality detection unit 71. The abnormality detection unit 71 detects an abnormality (for example, a failure) in the heat exchanger 63. When the abnormality in the heat exchanger 63 is detected by the abnormality detection unit 71, the control device ECU performs, for example, control for notifying the driver of the abnormality in the heat exchanger 63, control for preventing the operation of the rotary electric machine such as the electric motor 20 or the power generator 30, and the like.

Further, the abnormality detection unit 71 may detect an abnormality (for example, a failure) in the valve device 626. When the abnormality in the valve device 626 is detected by the abnormality detection unit 71, the control device ECU performs, for example, control for notifying the driver of the abnormality in the valve device 626, control for preventing the operation of the rotary electric machine such as the electric motor 20 or the power generator 30, and the like.

Returning to FIG. 1, when the first temperature adjustment medium TCM1 is ATF, a viscosity of the first temperature adjustment medium TCM1 is increased as the temperature of the first temperature adjustment medium TCM1 is decreased. Since the first temperature adjustment medium TCM1 flows through the electric motor 20 and the power generator 30, a friction loss generated in the electric motor 20 and the power generator 30 is increased, and output efficiencies of the electric motor 20 and the power generator 30 is decreased when the viscosity is increased. Therefore, when the electric motor 20 and the power generator 30 are not at a high temperature at the time of starting the electric motor 20 and the power generator 30 or the like, and the temperature of the first temperature adjustment medium TCM1 is equal to or lower than a predetermined temperature, the first temperature adjustment medium TCM1 does not need to be cooled and it is preferable that the first temperature adjustment medium TCM1 is not cooled.

When the detection value of the temperature of the first temperature adjustment medium TCM1 output from the first temperature sensor 61a is equal to or lower than the predetermined temperature, the control device ECU fully closes the valve device 626 and controls the valve device 626 so as to block the second temperature adjustment medium TCM2 from flowing through the second branch flow path 620b2.

When the second temperature adjustment medium TCM2 is blocked from flowing through the second branch flow path 620b2, the second temperature adjustment medium TCM2 is not supplied to the heat exchanger 63, and therefore, the heat exchange is not performed between the first temperature adjustment medium TCM1 and the second temperature adjustment medium TCM2, and the first temperature adjustment medium TCM1 is not cooled. Therefore, when the first temperature adjustment medium TCM1 does not need to be cooled, the first temperature adjustment medium TCM1 can be prevented from being cooled by the heat exchanger 63. As a result, it is possible to prevent an increase in friction loss generated in the electric motor 20 and the power generator 30.

An example of abnormality detection by the control device ECU will be described with reference to FIG. 2. For example, when an ignition power source of the vehicle V is turned on, the control device ECU executes the process illustrated in FIG. 2. The process is executed by, for example, the abnormality detection unit 71. As an initial state, it is assumed that the valve device 626 is fully opened.

First, the control device ECU starts driving the second pump 621 (step S201). Specifically, the control device ECU starts driving the second pump 621 by inputting a drive signal of a predetermined duty ratio to the second pump 621. The second pump 621 operates at a rotation speed corresponding to the duty ratio of a drive signal input from the control device ECU, thereby pressure-feeding the second temperature adjustment medium TCM2.

Next, the control device ECU acquires a temperature Toil_in of the first temperature adjustment medium TCM1 (the first temperature adjustment medium TCM1 upstream of the heat exchanger 63) flowing into the heat exchanger 63, which is detected by the first temperature sensor 61a (step S202). Next, the control device ECU determines whether the temperature Toil_in acquired in step S202 is equal to or higher than a threshold value TH0 (step S203). The threshold value TH0 is, for example, a value corresponding to a temperature sufficiently higher than the temperature of the second temperature adjustment medium TCM2 cooled by the radiator 622, and may be, for example, about 80 [° C.].

In step S203, when the acquired temperature Toil_in is not equal to or higher than the threshold value TH0 (step S203: No), it can be determined that a temperature difference between the first temperature adjustment medium TCM1 and the second temperature adjustment medium TCM2 is small, and it is difficult to accurately detect the abnormality of the heat exchanger 63. In this case, the control device ECU returns to step S202.

In step S203, when the acquired temperature Toil_in is equal to or higher than the threshold value TH0 (step S203: Yes), it can be determined that there is a certain degree of temperature difference between the first temperature adjustment medium TCM1 and the second temperature adjustment medium TCM2, and an abnormality in the heat exchanger 63 can be accurately detected. In this case, the control device ECU acquires the temperature Tw of the second temperature adjustment medium TCM2 flowing into the heat exchanger 63, which is detected by the third temperature sensor 620c (step S204).

Next, the control device ECU derives an estimated value Q1 of a heat exchange amount between the first temperature adjustment medium TCM1 and the second temperature adjustment medium TCM2 in the heat exchanger 63 based on the temperature Toil_in acquired in step S202 and the temperature Tw acquired in step S204 (step S205). For example, map information indicating the estimated value Q1 for each combination of the temperature Toil_in and the temperature Tw is stored in a memory accessible by the control device ECU, and the control device ECU derives the estimated value Q1 based on the map information.

Next, the control device ECU acquires the temperature Toil_out of the first temperature adjustment medium TCM1 (the first temperature adjustment medium TCM1 downstream of the heat exchanger 63) flowing out of the heat exchanger 63, which is detected by the second temperature sensor 610c (step S206). Next, the control device ECU determines whether a difference (Toil_in−Toil_out) between the temperature Toil_in acquired in step S202 and the temperature Toil_out acquired in step S206 is within a range of ±3 [° C.] of the estimated value Q1 of the heat exchange amount derived in step S205 (step S207).

Here, the estimated value Q1 of the heat exchange amount is an estimated value of a temperature change of the first temperature adjustment medium TCM1 in the heat exchanger 63 in a case where it is assumed that there is no abnormality in the heat exchanger 63. Therefore, in step S207, it is possible to determine whether an actual temperature change of the first temperature adjustment medium TCM1 in the heat exchanger 63 deviates from the estimated value of the temperature change of the first temperature adjustment medium TCM1 in the case where it is assumed that there is no abnormality in the heat exchanger 63.

In step S207, when the actual temperature change (Toil_in−Toil_out) of the first temperature adjustment medium TCM1 is not within the range of ±3 [° C.] of the estimated value Q1 of the heat exchange amount (step S207: No), the control device ECU determines that there is an abnormality in the heat exchanger 63 (step S208), and ends the series of processes.

In step S207, when the actual temperature change (Toil_in−Toil_out) of the first temperature adjustment medium TCM1 is within the range of ±3 [° C.] of the estimated value Q1 of the heat exchange amount (step S207: Yes), it can be determined that there is no abnormality in the heat exchanger 63. In this case, the control device ECU performs control to fully close the valve device 626 (step S209). In this case, when there is no abnormality in the valve device 626, the inflow of the second temperature adjustment medium TCM2 into the heat exchanger 63 is blocked, and a transition is made to a state where the heat exchange between the first temperature adjustment medium TCM1 and the second temperature adjustment medium TCM2 in the heat exchanger 63 is not performed. Here, the control device ECU stands by for a certain period of time so that the heat exchange between the first temperature adjustment medium TCM1 and the second temperature adjustment medium TCM2 in the heat exchanger 63 is not performed.

Next, the control device ECU acquires the temperature Toil_in of the first temperature adjustment medium TCM1 flowing into the heat exchanger 63, which is detected by the first temperature sensor 61a (step S210). In addition, the control device ECU acquires the temperature Toil_out of the first temperature adjustment medium TCM1 flowing out of the heat exchanger 63, which is detected by the second temperature sensor 610c (step S211).

Next, the control device ECU determines whether a difference (Toil_in−Toil_out) between the temperature Toil_in acquired in step S210 and the temperature Toil_out acquired in step S211 is within a range of ±3° C. (step S212). By step S212, it is possible to determine whether there is an actual temperature change of the first temperature adjustment medium TCM1 in the heat exchanger 63.

In step S212, when the actual temperature change (Toil_in−Toil_out) of the first temperature adjustment medium TCM1 is not within the range of ±3 [° C.] (step S212: No), it can be determined that the heat exchange is performed in the heat exchanger 63, that is, the inflow of the second temperature adjustment medium TCM2 into the heat exchanger 63 is not blocked, even though the control of fully closing the valve device 626 is performed in step S209. In this case, the control device ECU determines that there is abnormality in the valve device 626 (step S213), and ends the series of processes.

When the actual temperature change (Toil_in−Toil_out) of the first temperature adjustment medium TCM1 is within the range of ±3 [° C.] (step S212: Yes), as a result of performing the control of fully closing the valve device 626 in step S209, it can be determined that the heat exchange is not performed in the heat exchanger 63, that is, the inflow of the second temperature adjustment medium TCM2 into the heat exchanger 63 can be blocked. In this case, the control device ECU determines that there is no abnormality in the heat exchanger 63 and the valve device 626 (step S214), and ends the series of processes.

As described above, the control device ECU can detect the abnormality in the heat exchanger 63 which performs the heat exchange between the first temperature adjustment medium TCM1 and the second temperature adjustment medium TCM2 based on the temperature Toil_in of the first temperature adjustment medium TCM1 flowing into the heat exchanger 63, the temperature Toil_out of the first temperature adjustment medium TCM1 flowing out of the heat exchanger 63, and the temperature Tw of the second temperature adjustment medium TCM2 flowing into the heat exchanger 63.

That is, the abnormality in the heat exchanger 63 can be detected based on these temperatures by utilizing the fact that there is a certain relationship among the temperature Toil_in, the temperature Toil_out, and the temperature Tw when there is no abnormality in the heat exchanger 63.

For example, the abnormality in the heat exchanger 63 can be detected by deriving the estimated value Q1 of the heat exchange amount between the first temperature adjustment medium TCM1 and the second temperature adjustment medium TCM2 in the heat exchanger 63 based on the temperature Toil_in and the temperature Toil_out, and comparing the derived estimated value Q1 of the heat exchange amount with the actual temperature change amount (temperature Toil_out−temperature Toil_in) of the first temperature adjustment medium TCM1 in the heat exchanger 63.

However, the present invention is not limited to such an abnormality detection method. For example, the control device ECU may detect the abnormality in the heat exchanger 63 by deriving an estimated value of the temperature of the second temperature adjustment medium TCM2 flowing out of the heat exchanger 63 based on the temperature Toil_in and the temperature Toil_out, and comparing the derived estimated value of the temperature of the second temperature adjustment medium TCM2 with the actual temperature Toil_out of the second temperature adjustment medium TCM2 flowing out of the heat exchanger 63.

In addition, in a configuration in which the second temperature adjustment medium TCM2 is cooled by the radiator 622, by using each detection value of each temperature sensor in a state where the temperature Toil_in of the first temperature adjustment medium TCM1 flowing into the heat exchanger 63 is equal to or higher than a predetermined value (threshold value TH0), that is, in a state where there is a certain temperature difference between the first temperature adjustment medium TCM1 and the second temperature adjustment medium TCM2, it is possible to more accurately detect the abnormality in the heat exchanger 63.

In addition, the abnormality in the valve device 626 can be detected by detecting the abnormality in the heat exchanger 63 based on each detection value of each temperature sensor in a state where the valve device 626 is opened, performing control to close the valve device 626 when the abnormality of the heat exchanger 63 is not detected, and comparing the temperature Toil_in of the first temperature adjustment medium TCM1 flowing into the heat exchanger 63 with the temperature Toil_out of the first temperature adjustment medium TCM1 flowing out of the heat exchanger 63.

Figure 3:
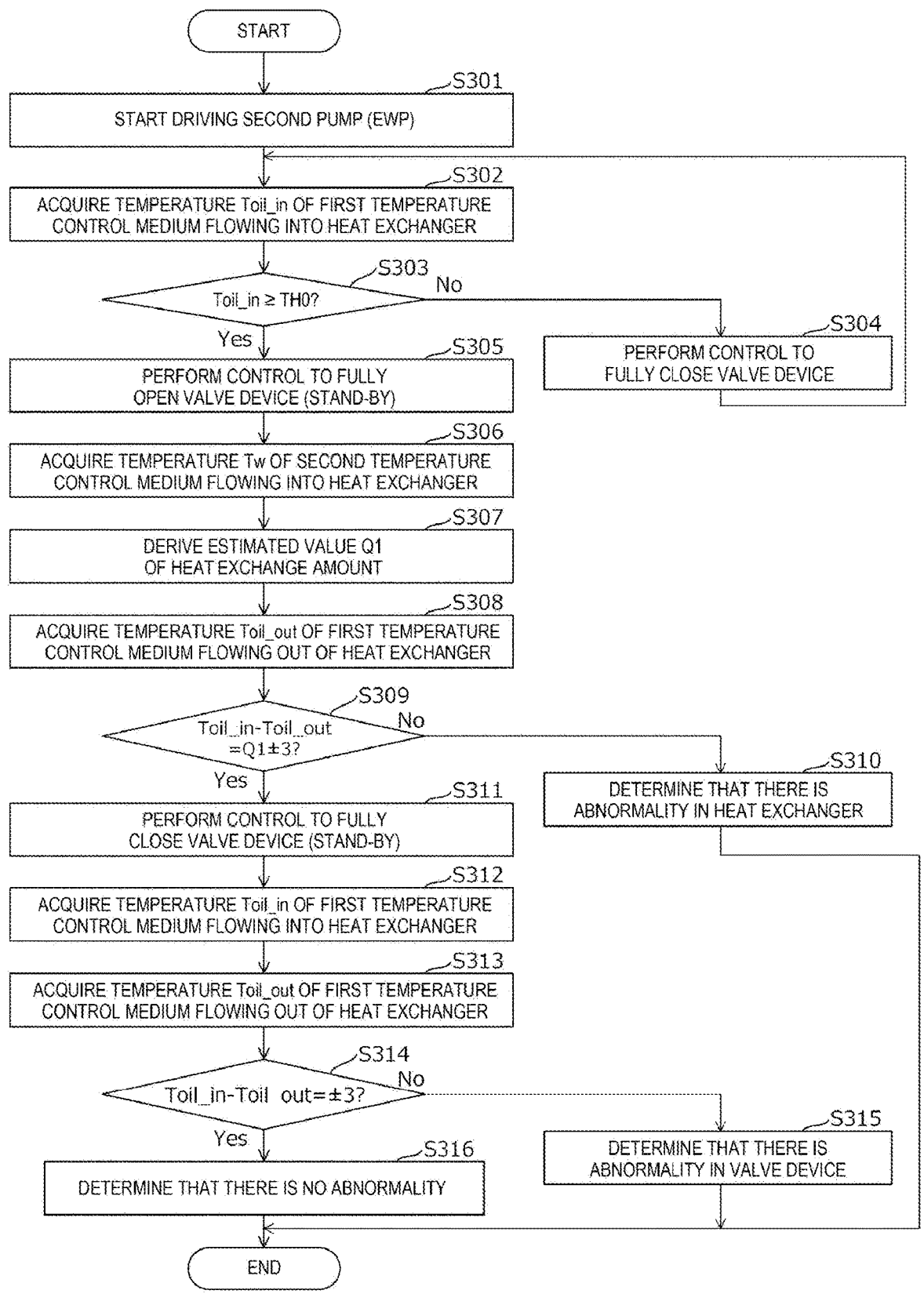
FIG. 3 is a flowchart illustrating another example of control performed by the abnormality detection unit.

Another example of abnormality detection by the control device ECU will be described with reference to FIG. 3. For example, when an ignition power source of the vehicle V is turned on, the control device ECU executes the process illustrated in FIG. 3. The process is executed by, for example, the abnormality detection unit 71. As an initial state, it is assumed that the valve device 626 is fully opened.

Figure 2:
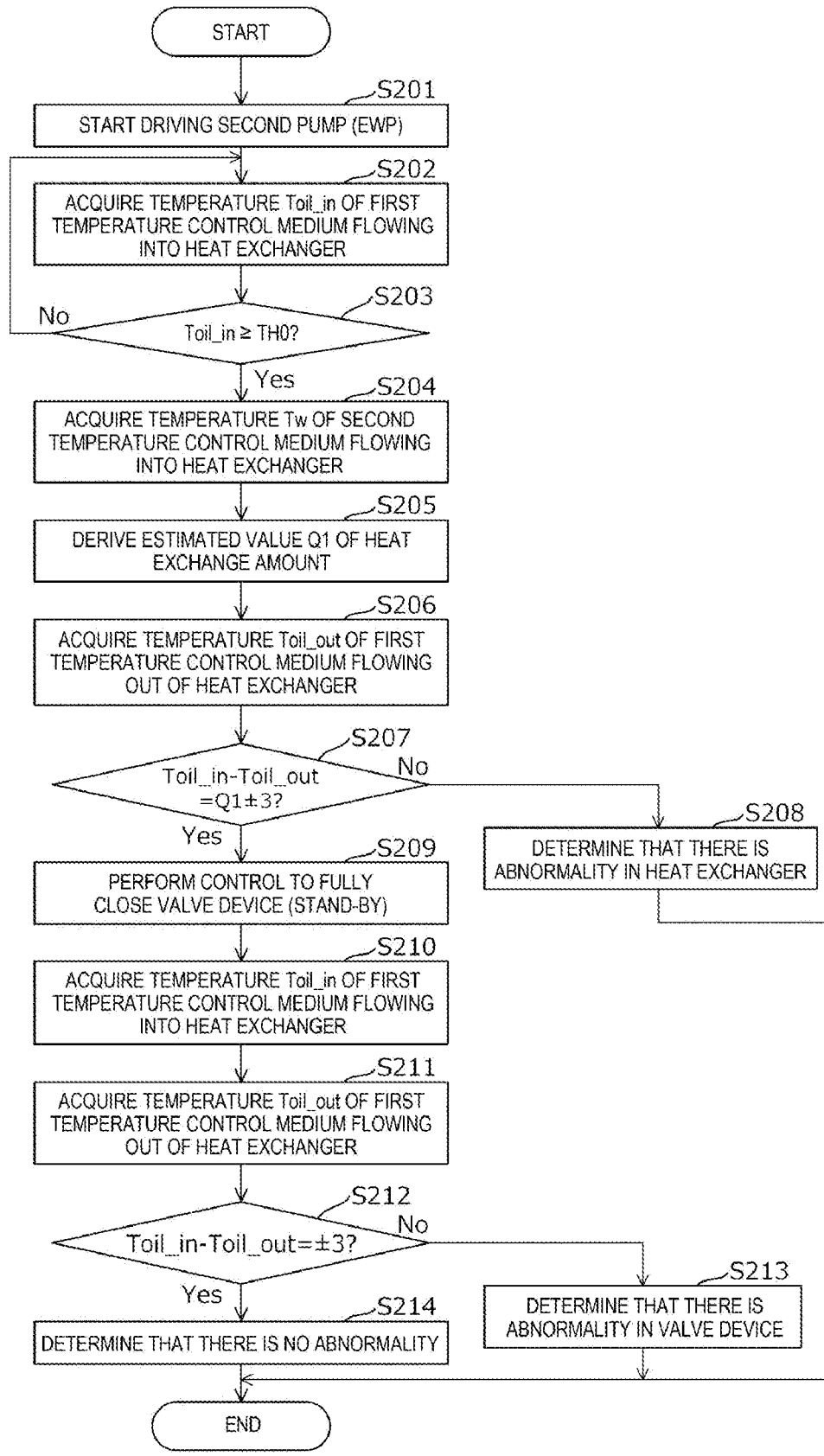
FIG. 2 is a flowchart illustrating an example of control performed by an abnormality detection unit.

Steps S301 to S303 are the same as steps S201 to S203 illustrated in FIG. 2. In step S303, when the acquired temperature Toil_in is not equal to or higher than the threshold value TH0 (step S203: No), the control device ECU performs control to fully close the valve device 626 (step S304), and returns to step S302. As a result, the inflow of the second temperature adjustment medium TCM2 into the heat exchanger 63 is blocked, the heat exchange between the first temperature adjustment medium TCM1 and the second temperature adjustment medium TCM2 in the heat exchanger 63 is not performed, and the temperature of the first temperature adjustment medium TCM1 flowing into the heat exchanger 63 is easily increased. When the valve device 626 is already fully closed in step S304, the control device ECU may not perform control to fully close the valve device 626.

In step S203, when the acquired temperature Toil_in is equal to or higher than the threshold value TH0 (step S203: Yes), the control device ECU performs control to fully open the valve device 626 (step S305). As a result, the second temperature adjustment medium TCM2 flows into the heat exchanger 63, and a transition is made to a state where the heat exchange is performed between the first temperature adjustment medium TCM1 and the second temperature adjustment medium TCM2 in the heat exchanger 63. Here, the control device ECU stands by for a certain period of time so that the heat exchange is performed between the first temperature adjustment medium TCM1 and the second temperature adjustment medium TCM2 in the heat exchanger 63. When the valve device 626 is already fully opened in step S305, the control device ECU may not perform the control of fully closing the valve device 626.

Next, the control device ECU proceeds to step S306. Steps S306 to S316 are the same as steps S204 to S214 illustrated in FIG. 2. In step S304, the process of controlling the control device ECU to fully close the valve device 626 has been described, but the control device ECU may control to reduce the flow rate of the valve device 626 (for example, control to half-open the valve device 626).

As described above, when the temperature of the first temperature adjustment medium TCM1 is less than the predetermined value (threshold value TH0), that is, when the temperature difference between the first temperature adjustment medium TCM1 and the second temperature adjustment medium TCM2 is small and it is difficult to accurately detect the abnormality in the heat exchanger 63, it is possible to limit the inflow of the second temperature adjustment medium TCM2 into the heat exchanger 63, prevent the heat exchange between the first temperature adjustment medium TCM1 and the second temperature adjustment medium TCM2, and increase the temperature of the first temperature adjustment medium TCM1. Then, after the temperature of the first temperature adjustment medium TCM1 is equal to or higher than the predetermined value, the limitation of the inflow of the second temperature adjustment medium TCM2 into the heat exchanger 63 is released to start the heat exchange between the first temperature adjustment medium TCM1 and the second temperature adjustment medium TCM2, and thereafter, by using the respective detection values of the respective temperature sensors, it is possible to more accurately detect the abnormality in the heat exchanger 63.

Although one embodiment of the present invention has been described above with reference to the accompanying drawings, it is needless to say that the present invention is not limited to such an embodiment. It will be apparent to those skilled in the art that various changes and modifications may be conceived within the scope of the claims, and it is also understood that the various changes and modifications belong to the technical scope of the present invention. The components in the embodiments described above may be combined freely within a range not departing from the spirit of the invention.

For example, although the configuration in which the vehicle V includes the internal combustion engine ICE has been described, the vehicle V may be an electric vehicle which does not include the internal combustion engine ICE.

Although the configuration in which the electric power conversion device 50 and the heat exchanger 63 are arranged in parallel has been described, the power conversion device 50 and the heat exchanger 63 may be arranged in series. For example, the electric power conversion device 50 may be disposed between the radiator 622 and the branching portion 624.

The configuration in which the first temperature sensor 61a of the storage unit 612 is used as the first temperature sensor which detects the temperature Toil_in of the first temperature adjustment medium TCM1 flowing into the heat exchanger 63 has been described, but the first temperature sensor which detects the temperature Toil_in may be a temperature sensor provided between the storage unit 612 and the heat exchanger 63 in the flow path of the first temperature adjustment medium TCM1. The first temperature sensor which detects the temperature Toil_in may be a temperature sensor provided at a position between the branching portion 613 and the transmission device 40 in the flow path of the first temperature adjustment medium TCM1.

Although the configuration in which the third temperature sensor 620c is used as the third temperature sensor which detects the temperature Tw of the second temperature adjustment medium TCM2 flowing into the heat exchanger 63 has been described, the third temperature sensor which detects the temperature Tw may be a temperature sensor provided between the branching portion 624 and the heat exchanger 63 in the flow path of the second temperature adjustment medium TCM2.

In the present specification, at least the following matters are described. In the parentheses, the corresponding constituent elements and the like in the above-described embodiment are illustrated as an example, and the present invention is not limited thereto.

(1) A vehicle temperature adjustment system (vehicle temperature adjustment system 10), including:
- a first temperature adjustment circuit (first temperature adjustment circuit 61) which includes a first pump (first pump 611) and through which a first temperature adjustment medium (first temperature adjustment medium TCM1) circulates;
- a second temperature adjustment circuit (second temperature adjustment circuit 62) which includes a second pump (second pump 621) and through which a second temperature adjustment medium (second temperature adjustment medium TCM2) circulates;
- a heat exchanger (heat exchanger 63) configured to perform heat exchange between the first temperature adjustment medium and the second temperature adjustment medium;
- a first temperature sensor (first temperature sensor 61a) configured to detect a temperature (temperature Toi1_in) of the first temperature adjustment medium flowing into the heat exchanger;
- a second temperature sensor (second temperature sensor 610c) configured to detect a temperature (temperature Toil_out) of the first temperature adjustment medium flowing out of the heat exchanger;
- a third temperature sensor (third temperature sensor 620c) configured to detect a temperature (temperature Tw) of the second temperature adjustment medium flowing into the heat exchanger; and
- a detection unit (abnormality detection unit 71) configured to detect an abnormality in the heat exchanger based on each detection value of the first temperature sensor, the second temperature sensor, and the third temperature sensor.

According to (1), it is possible to detect an abnormality in the heat exchanger which performs the heat exchange between the first temperature adjustment medium and the second temperature adjustment medium based on the temperature of the first temperature adjustment medium flowing into the heat exchanger, the temperature of the first temperature adjustment medium flowing out of the heat exchanger, and the temperature of the second temperature adjustment medium flowing into the heat exchanger.

(2) The vehicle temperature adjustment system according to (1), in which:
the detection unit derives an estimated value (estimated value Q1) of a heat exchange amount between the first temperature adjustment medium and the second temperature adjustment medium in the heat exchanger based on each detection value of the first temperature sensor and the third temperature sensor, and
the detection unit is configured to detect the abnormality in the heat exchanger based on the estimated value of the heat exchange amount and each detection value of the first temperature sensor and the second temperature sensor.

According to (2), the abnormality in the heat exchanger can be detected by comparing the estimated value of the heat exchange amount between the first temperature adjustment medium and the second temperature adjustment medium in the heat exchanger with the actual temperature change amount of the first temperature adjustment medium in the heat exchanger.

(3) The vehicle temperature adjustment system according to (1) or (2), in which:
the second temperature adjustment circuit includes a radiator (radiator 622) configured to perform heat exchange between the second temperature adjustment medium and outside air; and
the detection unit is configured to detect the abnormality in the heat exchanger based on the each detection value of the first temperature sensor, the second temperature sensor, and the third temperature sensor in a state where the temperature detected by the first temperature sensor is equal to or higher than a predetermined value (TH0).

According to (3), in a configuration in which the second temperature adjustment medium is cooled by the radiator, the abnormality in the heat exchanger can be detected more accurately by using the detection values of the temperature sensors in a state where the temperature of the first temperature adjustment medium flowing into the heat exchanger is equal to or higher than the predetermined value, that is, in a state where there is a certain temperature difference between the first temperature adjustment medium and the second temperature adjustment medium.

(4) The vehicle temperature adjustment system according to (3), in which:
the second temperature adjustment circuit includes:
- a first branch flow path (first branch flow path 620b1) of the second temperature adjustment medium bypassing the heat exchanger;
- a second branch flow path (second branch flow path 620b2) of the second temperature adjustment medium passing through the heat exchanger; and
- a flow rate adjustment valve (valve device 626) configured to adjust a flow rate of the second temperature adjustment medium to the second branch flow path; and the detection unit is configured to control the flow rate adjustment valve such that the flow rate of the second temperature adjustment medium to the second branch flow path is a first flow rate until the temperature detected by the first temperature sensor is equal to or higher than the predetermined value; and
the detection unit is configured to control the flow rate adjustment valve such that the flow rate of the second temperature adjustment medium to the second branch flow path is a second flow rate higher than the first flow rate when the temperature detected by the first temperature sensor is equal to or higher than the predetermined value, and then detect the abnormality in the heat exchanger based on the each detection value of the first temperature sensor, the second temperature sensor, and the third temperature sensor.

According to (4), when the temperature of the first temperature adjustment medium is less than the predetermined value, that is, when the temperature difference between the first temperature adjustment medium and the second temperature adjustment medium is small and it is difficult to accurately detect the abnormality in the heat exchanger, it is possible to limit the inflow of the second temperature adjustment medium into the heat exchanger, prevent the heat exchange between the first temperature adjustment medium and the second temperature adjustment medium, and increase the temperature of the first temperature adjustment medium. Then, after the temperature of the first temperature adjustment medium is equal to or higher than the predetermined value, the limitation of the inflow of the second temperature adjustment medium into the heat exchanger is released to start the heat exchange between the first temperature adjustment medium and the second temperature adjustment medium, and thereafter, by using the respective detection values of the respective temperature sensors, it is possible to more accurately detect the abnormality in the heat exchanger.

(5) The vehicle temperature adjustment system according to any one of (1) to (4), in which:
the second temperature adjustment circuit includes.
a first branch flow path of the second temperature adjustment medium bypassing the heat exchanger;
a second branch flow path of the second temperature adjustment medium passing through the heat exchanger; and
a flow rate adjustment valve configured to adjust a flow rate of the second temperature adjustment medium to the second branch flow path; and
the detection unit is configured to detect the abnormality in the heat exchanger based on the each detection value of the first temperature sensor, the second temperature sensor, and the third temperature sensor in a state where the flow rate adjustment valve is open; and
the detection unit is configured to perform control to close the flow rate adjustment valve when the abnormality in the heat exchanger is not detected, and then detects the abnormality in the flow rate adjustment valve based on each detection value of the first temperature sensor and the second temperature sensor.

According to (5), the abnormality in the flow rate adjustment valve can be detected by performing control to close the flow rate adjustment valve in a state where it is confirmed that there is no abnormality in the heat exchanger, and comparing the temperature of the first temperature adjustment medium flowing into the heat exchanger with the temperature of the first temperature adjustment medium flowing out of the heat exchanger.

What is claimed is:

1. A vehicle temperature adjustment system, comprising:
a first temperature adjustment circuit which includes a first pump and through which a first temperature adjustment medium circulates;
a second temperature adjustment circuit which includes a second pump and through which a second temperature adjustment medium circulates;
a heat exchanger configured to perform heat exchange between the first temperature adjustment medium and the second temperature adjustment medium;
a first temperature sensor configured to detect a temperature of the first temperature adjustment medium flowing into the heat exchanger;
a second temperature sensor configured to detect a temperature of the first temperature adjustment medium flowing out of the heat exchanger;
a third temperature sensor configured to detect a temperature of the second temperature adjustment medium flowing into the heat exchanger; and
a abnormality detector configured to detect an abnormality in the heat exchanger based on each detection value of the first temperature sensor, the second temperature sensor, and the third temperature sensor,
wherein the second temperature adjustment circuit includes a radiator configured to perform heat exchange between the second temperature adjustment medium and outside air.

2. The vehicle temperature adjustment system according to claim 1, wherein:
the abnormality detector derives an estimated value of a heat exchange amount between the first temperature adjustment medium and the second temperature adjustment medium in the heat exchanger based on each detection value of the first temperature sensor and the third temperature sensor; and
the abnormality detector is configured to detect the abnormality in the heat exchanger based on the estimated value of the heat exchange amount and each detection value of the first temperature sensor and the second temperature sensor.

3. The vehicle temperature adjustment system according to claim 1, wherein:
the abnormality detector is configured to detect the abnormality in the heat exchanger based on the each detection value of the first temperature sensor, the second temperature sensor, and the third temperature sensor in a state where the temperature detected by the first temperature sensor is equal to or higher than a predetermined value.

4. The vehicle temperature adjustment system according to claim 3, wherein:
the second temperature adjustment circuit includes:
a first branch flow path of the second temperature adjustment medium bypassing the heat exchanger;
a second branch flow path of the second temperature adjustment medium passing through the heat exchanger; and
a flow rate adjustment valve configured to adjust a flow rate of the second temperature adjustment medium to the second branch flow path; and
the abnormality detector is configured to control the flow rate adjustment valve such that the flow rate of the second temperature adjustment medium to the second branch flow path is a first flow rate until the temperature detected by the first temperature sensor is equal to or higher than the predetermined value; and
the abnormality detector is configured to control the flow rate adjustment valve such that the flow rate of the second temperature adjustment medium to the second branch flow path is a second flow rate higher than the first flow rate when the temperature detected by the first temperature sensor is equal to or higher than the predetermined value, and then detect the abnormality in the heat exchanger based on the each detection value of the first temperature sensor, the second temperature sensor, and the third temperature sensor.

5. The vehicle temperature adjustment system according to claim 1, wherein:
the second temperature adjustment circuit includes:
a first branch flow path of the second temperature adjustment medium bypassing the heat exchanger;
a second branch flow path of the second temperature adjustment medium passing through the heat exchanger; and
a flow rate adjustment valve configured to adjust a flow rate of the second temperature adjustment medium to the second branch flow path; and the abnormality detector is configured to detect the abnormality in the heat exchanger based on the each detection value of the first temperature sensor, the second temperature sensor, and the third temperature sensor in a state where the flow rate adjustment valve is open; and the abnormality detector is configured to perform control to close the flow rate adjustment valve when the abnormality in the heat exchanger is not detected, and then detect the abnormality in the flow rate adjustment valve based on each detection value of the first temperature sensor and the second temperature sensor.

* * * * *